US011222254B2

(12) United States Patent
Carbon et al.

(10) Patent No.: US 11,222,254 B2
(45) Date of Patent: Jan. 11, 2022

(54) OPTIMIZED NEURON CIRCUIT, AND ARCHITECTURE AND METHOD FOR EXECUTING NEURAL NETWORKS

(71) Applicant: COMMISSARIAT A L'ÉNERGIE ATOMIQUE ET AUX ÉNERGIES ALTERNATIVES, Paris (FR)

(72) Inventors: Alexandre Carbon, Bures sur Yvette (FR); Olivier Bichler, Massy (FR); Marc Duranton, Orsay (FR); Jean-Marc Philippe, Gif-sur-Yvette (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 819 days.

(21) Appl. No.: 16/064,427

(22) PCT Filed: Dec. 7, 2016

(86) PCT No.: PCT/EP2016/080004
§ 371 (c)(1),
(2) Date: Jun. 20, 2018

(87) PCT Pub. No.: WO2017/108399
PCT Pub. Date: Jun. 29, 2017

(65) Prior Publication Data
US 2018/0373977 A1   Dec. 27, 2018

(30) Foreign Application Priority Data

Dec. 21, 2015   (FR) ...................................... 1562918

(51) Int. Cl.
*G06N 3/04* (2006.01)
*G06N 3/063* (2006.01)

(52) U.S. Cl.
CPC ........... *G06N 3/0481* (2013.01); *G06N 3/063* (2013.01)

(58) Field of Classification Search
CPC .............................. G06N 3/0481; G06N 3/063
(Continued)

(56) References Cited

U.S. PATENT DOCUMENTS

| 5,535,148 A | 7/1996 | Osborn et al. |
| 9,269,041 B2* | 2/2016 | McCormick ............. G06N 3/04 |
| 2004/0098548 A1* | 5/2004 | Hansen ..................... G06F 9/30 711/165 |

OTHER PUBLICATIONS

Tiwari et al., "Hardware implementation of neural network with Sigmoidal activation functions using CORDIC", Microprocessors and Microsystems 39 (2015)373-381 [hereafter Tiwari] (Year: 2015).*

(Continued)

*Primary Examiner* — Tsu-Chang Lee
(74) *Attorney, Agent, or Firm* — BakerHostetler (57) ABSTRACT

A neuron circuit is capable of producing a weighted sum of digitized input signals and applying an activation function to the weighted sum so as to produce a digitized activation signal as output. The circuit includes at least: one multiplier multiplying each input signal ($x_1$ to $x_n$) with a weight value ($w_{1j}$ to $w_{nj}$), one accumulator accumulating the results of the multiplier so as to produce the weighted sum, and one activation unit executing the activation function. The activation unit comprises at least one shift unit and at least one saturation unit capable of approximating a non-linear activation function. The result of the approximated activation function is obtained by one or more arithmetic shifts applied to the weighted sum.

17 Claims, 3 Drawing Sheets

(58) Field of Classification Search
USPC .......................................................... 706/43
See application file for complete search history.

(56) References Cited

OTHER PUBLICATIONS

Mohammed, et al., "Hardware Implementation of Artificial Neural Network Using Field Programmable Gate Array", International Journal of Computer Theory and Engineering, vol. 5, No. 5, pp. 780-783, Oct. 2013, XP055303784.
Pushpa, et al.," Implementation of Hyperbolic Tangent Activation Function in VLSI", International Journal of Advanced Research in Computer Science & Technology, vol. 2, No. Special 1, pp. 225-228, Mar. 1, 2014, XP055303543.
Skrbek, "Fast Neural Network Implementation", pp. 375-391, Jan. 1, 2000, XP055303532.
Ortigoza, et al., "Hardware description of multi-layer perceptrons with different abstraction levels", Microprocessors and Microsystems, vol. 30, No. 7, pp. 435-444, Apr. 27, 2006, XP027950028.

* cited by examiner

OPTIMIZED NEURON CIRCUIT, AND ARCHITECTURE AND METHOD FOR EXECUTING NEURAL NETWORKS

CROSS-REFERENCE TO RELATED APPLICATIONS

This application is a National Stage of International patent application PCT/EP2016/080004, filed on Dec. 7, 2016, which claims priority to foreign French patent application No. FR 1562918, filed on Dec. 21, 2015, the disclosures of which are incorporated by reference in their entirety.

FIELD OF THE INVENTION

The present invention concerns an optimized neuron circuit. It also concerns an architecture for executing neural networks based on such a circuit. The invention further concerns a method for executing neural networks able to be applied by means of this architecture, for example.

BACKGROUND

The invention applies in particular for the implementation of neural networks on silicon for processing various signals, including multidimensional signals such as images. The invention can more particularly concern deep neural networks, such as convolutional neural networks including, in particular, preprocessings of different-sized convolutional-type images.

Deep neural networks, and more specifically convolutional neural networks, have the distinctive feature of being organized in the form of a potentially high number of successive processing layers, with the aim of extracting more and more relevant information from the inputs while reducing the volume of manipulated data as the processing chain is negotiated. This reduction is accomplished with the aid of a succession of convolution and calculation layers for local maxima (these two layers in particular highlighting certain learned characteristics if they exist in the input data), then finally classification layers. The final classification allows the input data to be categorized according to needs determined offline, during learning, for example recognition of objects in an image.

The description of this processing chain shows that the principal operations are accumulations of multiplications (weighted sums) between convolution filter coefficients or synaptic weights and input data for the layers. This is the case, for example, for convolution layers of the network input (coefficients) or for "fully-connected" layers (synaptic weights). In this example, a "fully-connected" layer is made up of neurons whose inputs are connected to all the outputs of the previous layer. These operations may be called MAC below for multiplication and accumulation. The chain also includes a maximum operation that returns the maximum value from a vicinity (for example the pixel having the greatest intensity if images are processed). Finally, following the MACs, there is generally a nonlinear operation. This nonlinear function may be a sigmoid function, a hyperbolic tangent or else a linear rectifier, for example. Some classifier variants also use radial basis functions such as a Gaussian function (as in the case of RBF "Radial Basis Function" networks).

Figure 1:
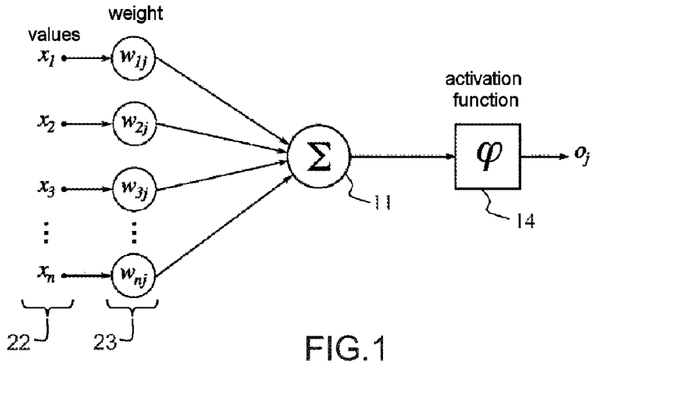
FIG. 1, already described, depicts modeling of a formal neuron.

FIG. 1 illustrates the modeling of a formal neuron, typically used in a deep neural network, implementing this series of MACs followed by a nonlinear function. The $j^{th}$ formal neuron of a neuron layer forms a sum 11 of the input values 12, $x_1$ to $x_n$, weighted with synaptic weights 13, $w_{1j}$ to $w_{nj}$, and finally applies an activation function 14, which is the nonlinear function. These operations constitute the principal functionality of a neural network. Practice shows that it is necessary to optimize the performance of these operations, vis à vis hardware implementation constraints but also characteristics of neural networks. Hardware implementation constraints include in particular production cost (for example silicon surface area), power consumption during execution, precision and hardware implementation problems for the nonlinear activation functions, these functions generally being complex to carry out on hardware.

Moreover, the type of neural network (interconnection topology, numbers of neurons, nonlinear functions, etc.) implemented on an architecture is very highly dependent on the targeted application. On the other hand, the evolution of the dynamics of the data (number of quantization levels for the values of these data, depending on the number of coding bits) within this network is highly dependent on the data set 12 of the input (images, signals, intermediate data, etc.). Equally, the precision of the manipulated data in the accumulation 11 is dependent on the position in the chain. In a conventional convolutional neural network (CNN), the convolutions continue to have relatively small dimensions, for example from 3×3 to 11×11, in this case requiring accumulation of up to 121 values. When changing to "fully-connected" classification levels, and in particular on hidden layers, situated before the final decision layer, it is necessary to accumulate potentially more values (corresponding to the outputs of the previous layer that are weighted by synaptic weights). This can necessitate several thousand or tens of thousand accumulations. Thus, dedicated CNN circuits in particular have the distinctive feature of requiring the accumulation of a large volume of data on each of the layers.

In addition to the problem of good initial architectural sizing of a circuit, for example maximum precision for the data and maximum precision for the calculation operators, quite particular attention needs to be brought to the evolution of the values of the internally manipulated data so as to avoid any saturation, without any prior knowledge of the data set at the input. For example, the maximum accumulation permitted by the architecture, as given by the size of the accumulation register in number of bits, needs to be taken into consideration. Indeed, saturation in the course of accumulation calculation causes error propagation that is potentially amplified by the activation function 14, and propagated over the various successive layers, bringing about calculation of an erroneous result and therefore an increased risk of false classification.

Finally, some networks, for example those using radial basis functions known as RBF, require the production of data sums (for example coming from base subtractions) whose magnitudes are not known in advance. Moreover, the relative magnitudes of two different values to be summed in this case are sometimes even very different. This makes it extremely complicated to control the consistency of the result automatically (in particular when a large value is summed with several small ones in succession).

The above paragraphs therefore show that a problem with controlling the dynamics of the data arises, as well as encoding them with respect to one another. A solution involves producing a purely dedicated architecture for a targeted network, resulting in a specific design for this network to the detriment of flexibility, since the architecture cannot be used for another application. Such a solution is not within the scope of the present invention, which aims to target several types of networks using the same architecture.

Most of the prior art architectures try to form calculations more or less in the manner in which a conventional computer program on a computer would do, that is to say by trying to be close to the formal neuron model, in particular as far as the nonlinear function 14 is concerned. For example, on some architectures, data precision is rather important, the data being encoded on at least 16 bits with a fixed point. A critical aspect in the hardware implementation of neural networks is the calculation of the activation functions 14 of the formal neuron model, because they are nonlinear and therefore complex to perform. Several techniques are used to achieve approximation of these nonlinear functions, such as piecewise linear approximation, for example, which can be coupled to a memory allowing certain values of these functions to be programmed in several ranges and the other values to be interpolated. However, these solutions are unsatisfactory from the point of view of the surface (dedicated logic and additional memory to be included in the circuit, with associated power consumption) and latency (potentially a large number of calculation cycles).

As a general rule, architectures implementing neural networks are built on the basis of the sequence of operations that they have to implement. They have a first part made up of one or more multipliers, an accumulator (to sum the multiplications) and then a block performing one or more nonlinear functions, on the formal neuron model described in FIG. 1. As far as this first part is concerned, few differences arise between the architectures, except for the various precisions implemented, precision of the input data, of weights and width of the accumulator, in particular. On the other hand, several techniques are implemented to realize nonlinear aspects of the activation functions. A first solution of piecewise linear approximation type has been presented above. Other solutions are also implemented, using programmable tables, which are implemented with memory (potentially external to the circuit itself) and comparators allowing an output value to be associated with a range of input values, for example. This technique thus allows several types of functions to be implemented such as binary thresholding, requiring only two output values, or more complex functions. Indeed, the more lines there are in the memory, the greater the possible precision of the approximation of the function. A hyperbolic tangent, for example, can thus be approximated sufficiently for the application using a large table. The tables can be coupled to logic operators allowing even more complex functions to be performed using piecewise linear approximation as indicated above.

In other solutions, nonlinear fun are implemented by means of a system having two LUT (Look-Up Table) tables, one table being used for the standard implementation of nonlinear functions and the other table being used with better precision for a quite particular range in the function, for example around 0 in the case of a sigmoid function.

Other solutions are based on communication and the serial processing of data (bit by bit). More particularly, these solutions propose separating the calculation of the activation function into two parts, one part being performed locally in each neuron and the other part being performed globally by being shared by different neurons. The nonlinearity is accomplished by a centralized calculation block in the architecture by accessing a table.

Analysis of the prior art solutions brings to light the following points: numerous architectures, owing to the complexity of implementation in the available technology and in order to separate constraints, move the calculation of nonlinearities to an external circuit, in any case outside the main architecture allowing the neural network to be implemented;

most then use tables (for example Look-Up Tables) and/or piecewise linear approximations.

The use of a table, and in particular of a "Look-Up Table", is silicon-greedy and requires the table to be loaded and unloaded according to the approximated activation function or else according to the input value.

Finally, realizing an elementary processor implementing a generic formal neuron model, that is to say capable of covering a large number of different types of neural networks and therefore applications, poses problems for the implementation of nonlinear functions resulting in a memory space (and therefore silicon surface area and power consumption) cost and/or in the use of approximations limiting the coverage of the applications, thus compromising flexibility of use. This realization also poses a problem for the management of the relative magnitudes of the data, in particular in order to calculate complex activation functions in RBF networks, using Gaussian functions.

SUMMARY OF THE INVENTION

The aim of the invention is, in particular, to solve these problems. In other words, its aim is to allow the effective implementation on silicon of deep layer neural networks, tolerant to a low precision of the manipulated data but not to the accumulation of errors, requiring numerous multiplications/accumulations and nonlinear functions, all of this with variable precision of the intermediate data. This effectiveness results in particular in a small occupied silicon surface area, a low power consumption and in the use of standard logic cells (which are available in all conventional technologies).

To this end, the subject of the invention is a neuron circuit capable of producing a weighted sum of digitized input signals and of applying an activation function to said weighted sum in order to produce a digitized activation signal at the output, said circuit having at least:
one multiplier multiplying each input signal ($x_1$ to $x_n$) by a weight value ($w_{1j}$ to $w_{nj}$);
one accumulator accumulating the results of said multiplier in order to produce said weighted sum, and;
one activation unit performing said activation function;
said activation unit having at least one shift unit capable of approximating a nonlinear activation function, the result of said approximated activation function being obtained by one or more arithmetic shifts applied to said weighted sum.

In a particular embodiment, the activation unit has a saturation unit capable of performing a saturation operation directly on said weighted sum or on a temporary result of the activation function before saturation, the saturated datum being delivered at the output of said activation unit.

By way of example, the saturation unit is combined with the shift unit, the saturation being produced by a shift to the right on said sum, the value of which is deduced from the desired saturation position, by preserving the least significant bits according to the desired final precision.

In another possible embodiment, the activation unit has a linear rectifier capable of performing, moreover, a linear rectification on the datum present at the output of the saturation unit, said datum being the result of a saturation performed directly on said weighted sum present at the input of said activation unit, said linear rectification carrying out said activation function.

By way of example, said neuron circuit has a register storing the position of the most significant bit of each new datum accumulated in said accumulator, the storage of said position being performed simultaneously with the storage in the accumulation register of the accumulation of said new datum or of the loading of said accumulation register.

By way of example, said position of the most significant bit is transmitted to the shift unit, the shift applied being deduced from said position, or from a previously saved most significant bit position or from any parameter fixed by the user or contained in memory or previously calculated.

By way of example, said position of the most significant bit is transmitted to the saturation unit, the shift applied for the saturation operation being deduced from said position or from a previously saved most significant bit position, or from any parameter fixed by the user or contained in memory or previously calculated.

By way of example, said activation unit is capable of approximating a radial basis function, from a sequence of shift operations performed by said shift unit as well as by means of saturations performed by said saturation unit. By way of example, the value of each shift is deduced from said position of the most significant bit of the shifted datum or from a previously saved bit position, or from any parameter fixed by the user or contained in memory or previously calculated.

By way of example, said neuron circuit has an arithmetic and logic unit carrying out operations on the input signals.

The invention also concerns a neural architecture made up of neuron circuits such as the one described above.

The invention further concerns a method for executing a neural network, said method producing, for each neuron, a weighted sum of digitized input signals, which are encoded on a given number of bits, and applying an activation function to said weighted sum in order to produce an activation signal at the output, said method involving at least the following steps:

multiplying each input signal ($x_1$ to $x_n$) by a weight value ($w_{1j}$ to $w_{nj}$);

accumulating the results of the multiplication in an accumulator in order to produce said weighted sum, and;

performing said activation function by means of one or more arithmetic shifts in the bits of said weighted sum that are stored in said accumulator.

In a particular implementation, said method performs a saturation operation directly on said weighted sum or on said result of the activation function, the saturated datum being delivered at the output of said activation function.

By way of example, said method performs, moreover, a linear rectification on the datum present at the output of the saturation operation, said datum being the result of a saturation performed directly on said weighted sum, said linear rectification carrying out said activation function.

By way of example, it has a step of storage of the position of the most significant bit of each new accumulated datum, said storage step being performed simultaneously with the storage of said new datum.

By way of example, the shift(s) applied in order to perform said activation function is or are deduced from said position or from a previously saved most significant bit position, or from any parameter fixed by the user or contained in memory or previously calculated.

By way of example, the shift(s) applied for the saturation operation is or are deduced from said position or from a previously saved most significant bit position, or from any parameter fixed by the user or contained in memory or previously calculated.

Said method can carry out the approximation of a radial basis activation function, from a sequence of shift operations as well as by means of saturations. The value of each shift is deduced from said position of the most significant bit of the shifted datum or from a previously saved bit position, or from any parameter fixed by the user or contained in memory or previously calculated.

Said method is capable of being applied by means of an architecture as described above.

The invention also concerns a computer program product, comprising code instructions allowing the steps of said method to be performed when said computer program is executed on a computer.

BRIEF DESCRIPTION OF THE DRAWINGS

Other features and advantages of the invention will emerge from the description with reference to the appended figures, in which.

DETAILED DESCRIPTION

Figure 2:
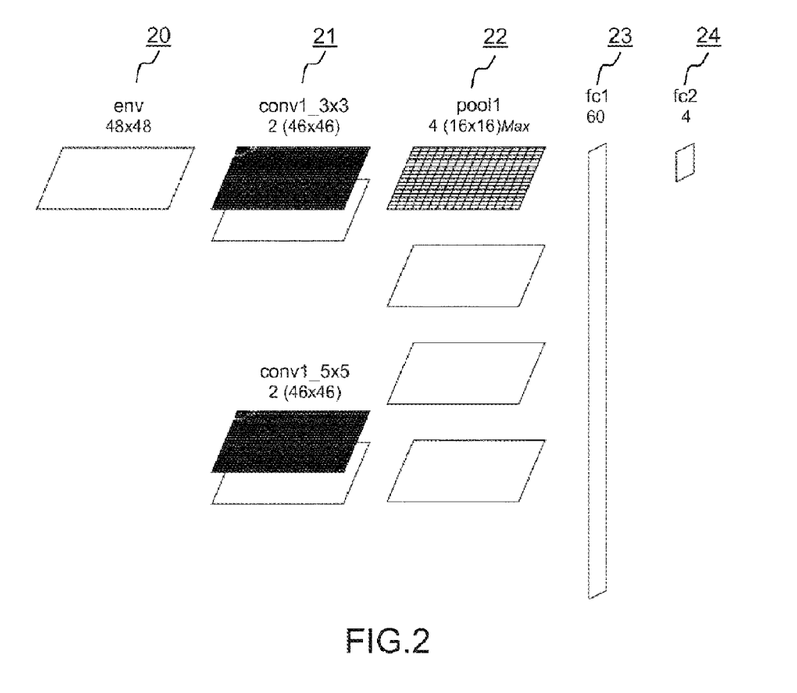
FIG. 2 depicts an example of convolutional neural networks.

FIG. 2 shows an example of a convolutional neural network, made up of four successive stages:

a convolution stage 21, performing two convolutions with 3×3 filters and two convolutions with 5×5 filters on an input image 20, a nonlinear function moreover being applied at the output;

a stage 22 of local maxima type (pool1, also called "max pooling"); a "fully-connected" stage 23 (fc1) with 60 neurons (hidden layer of the classifier), each neuron corresponding to the accumulation of all of the weighted values at the output of the "max pooling" stage with application of a nonlinear function to the result of this accumulation, this function being a hyperbolic tangent, for example;

a second "fully-connected" stage 24 (fc2) with 4 neurons on the output layer (comprising the weighted sums and the application of an activation function).

The application using this type of neural networks requires, in particular, management of operations of multiplication, accumulation and nonlinear function approximation type. Other operations are also necessary and need to be added to the path of global data inside the processor implementing the network in order to allow execution of the applications, such as the operations of local maximum type for the "max pooling" phases (determination of the maximum value of the data on a mask and extraction of this value at the output).

The invention particularly concerns the elementary processors or circuits implementing a neural model of the type from FIG. 1, in particular implementing the critical operators that are multiplication and accumulation and the nonlinear activation functions.

In the face of the predominance of multiplication/accumulation operations on the convolutional layers and the "fully-connected" layers within convolutional networks, it is essential to realize said layers with high performance levels. This is the reason that multiplication and accumulation operators need to be able to work simultaneously, either in a pipeline or not. Another essential aspect from the point of view of performing convolutions using large-sized filters and in order to make it possible to realize "fully-connected" stages is ensuring adequate sizing of the accumulation register, so as to guarantee the possibility of accumulating a large number of weighted elements.

Figure 3:
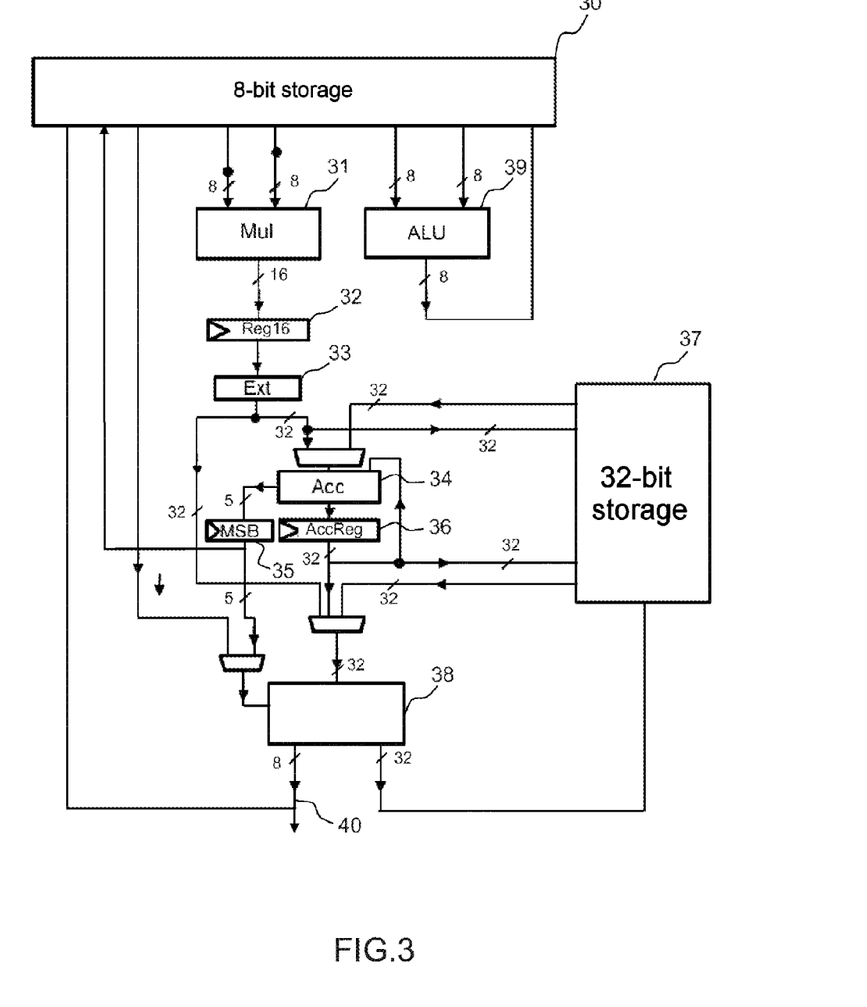
FIG. 3 depicts an exemplary embodiment of a neuron circuit according to the invention.

FIG. 3 illustrates an exemplary embodiment of a neuron circuit according to the invention. As an example, the input data are encoded on 8 bits in this case. A circuit according to the invention is of course able to work with other codings (for example 4 or 16 bits). Said circuit can therefore be changed, keeping in mind the consequences of its evolution on the various operators (typically the accumulator). In this regard, each operator and storage structure can be adapted to the application. For example, the accumulator can store 48 or 64 bits with 8-bit data at the input if numerous accumulations are necessary in the processing chain implemented.

The circuit has a multiplication unit 31. The input thereof receives firstly the input values 12, $x_1$ to $x_n$, and secondly the synaptic weights 13, $w_{1j}$ to $w_{nj}$. In an exemplary embodiment, this unit allows signed and unsigned 8-bit data (from the storage memory 30) to be managed so that it is possible to perform multiplications of unsigned data by signed data and multiplications of signed data by signed data. In the 8-bit embodiment of FIG. 3, a signed result on 16 bits is thus obtained. This result, corresponding to a weighted input, $x_i \times w_{ij}$, is then sent to a pipeline register 32. In the example of FIG. 3, this intermediate register is a 16-bit register. It is optional, its use depending in particular on the desired maximum length of the critical path within the neuron circuit (determining the operating frequency of the circuit). The choice to manage unsigned and signed numbers is linked to a specificness of the processings to be performed. Indeed, while the weights 13, allowing weighting of the input data both for convolution stages and for "fully connected" stages, are signed, these input data 12 may be unsigned in order to preserve a full coding dynamic range. This is the case, for example, for pixel values encoded on 8 bits as unsigned in order to preserve the dynamic range of 256 values between 0 and 255.

The register 32 is followed by an extension unit 33, which is also optional. Said extension unit allows extension of the length of the data, 16 bits to 32 bits in the example of FIG. 3, by copying over the sign bit (operation called sign extension).

An accumulation unit 34 is then present on the path of the data.

In an 8-bit mode of operation, like the example in FIG. 3, involving a succession of multiplication and accumulation operations performed by the multiplier 31 and the accumulator 34, the signed 16-bit datum recovered at the output of the pipeline register 32 of the multiplier, in the cycle following the multiplication, is extended to 32 bits (for example) according to its sign bit, and then is accumulated within the accumulation register with the content of the latter. The accumulation unit thus sums 11 the weighted values throughout successive cycles.

In an advantageous embodiment, the position of the significant bit of the result of each new accumulation is calculated simultaneously with the accumulation of a new datum. The significant bit, which is also called the most significant bit, will be called the MSB below. This MSB can also correspond to the sign of the datum.

The position of the MSB is stored in a register 35, called the MSB register, provided for this purpose. In parallel, the last accumulated value is stored in a register 36 at the output of the accumulation unit 34. In the example of FIG. 3, the position of the MSB is encoded on 5 bits so as to encode the $2^5=32$ possible positions.

This calculation and this storage of the position of the MSB in relation to the current datum contained in the accumulation register allows the calculation of complex nonlinear activation functions, in a simple manner. This calculation is described below. The various positions of the MSB can be saved for later use.

In terms of function, the accumulator thus allows both loading of a value for the purpose of initializing its associated register and accumulation of this incoming value with the current value within this very register. In all cases, the position of the sign bit (MSB) of the word to be loaded into the accumulation register is updated. This accumulated or loaded datum comes either from the multiplier 31, after sign extension 33 from 16 to 32 bits, or from a backup register 37, which can store the data on 8, 16 or 32 bits, extended to 32 bits by sign extension.

To calculate the activation functions, the neuron circuit according to the invention has a generic activation unit 38. This unit allows calculation of the activation functions 14 likely to be used within the neurons included in the various layers. More particularly, it performs approximation of these nonlinear functions. Advantageously, the trials and simulations carried out by the Applicant have shown that the nonlinear activation functions can legitimately be approximated on the basis of bit shifts. The generic activation unit therefore has an arithmetic shift unit, performing shifts to the right or left according to the needs of the approximation. In terms of function, said arithmetic shift unit allows a 32-bit word, coming from the backup register 37 or from the accumulator 36, to be shifted both left and right from any value between 0 and 31 (based on the example of an 8-bit mode of operation with a 32-bit accumulator), for example. It thus allows this value to be multiplied or divided by a multiple of 2. The generic activation unit 38 also has a saturation function, allowing saturation of the incoming value (for example encoded on 32 bits) on 8 bits in our example. Advantageously, in order to pool the resources, this saturation is performed with the aid of the shift unit, for example, by performing a shift to the right on the incoming 32-bit word in relation to the position of the desired saturation, by preserving the least significant bits according to the desired final precision. The result, encoded on 8 bits in our example, is present at the output 40 of the unit 38, and corresponds to the 8 least significant bits of the 32-bit word after shifting.

The generic activation unit 38 also has a function of linear rectifier type, returning 0 if the value of the saturated number is negative, or returning the value in question if not. In other words, the linear rectifier acts as the output of the saturation.

The activation function 14 is used more and more in deep neural networks. Owing to the invention, it is possible to approximate (possibly in one clock cycle) nonlinear activation functions, in particular sigmoid functions, hyperbolic tangent or linear rectifier. This approximation is at least sufficient to preserve a full application functionality for the neural networks using them, as shown by the trials and simulations performed by the Applicant.

Other complex functions can also be performed using a sequence of operations over several cycles. This is the case in particular for the radial basis functions of RBF classifiers, in particular the Gaussian function. This type of network requires calculation of a distance between the input data and a reference (the distance being implemented as being the square of the Euclidian distance between the vector of the inputs and the vector of the reference data, for example) before application of the radial basis function and saturation. The value of the shift and/or of the saturation is controlled by a 5-bit word at the input, for the example of an accumulated 32-bit datum, indicating the shift to be performed between 0 and 31 bits, as well as a control word on 2 bits, allowing indication of whether a shift to the right, to the left, a saturation or a linear rectifier is involved. The shift, encoded on 5 bits, can be specified directly by the user via the "immediate" field of a control instruction or can come from the memory or from a backup register via the associated control instruction (value placed in memory or previously calculated), or can advantageously be deduced from the position of the MSB of the accumulated word, as contained on the MSB register 35, thus allowing saturation and/or direct normalization thereof to be performed in the next cycle.

From the perspective of being reused, the MSB bit can be sent to a backup register, in particular in order to perform normalization to an identical position on various 32-bit words, this being in particular useful for calculating a Gaussian function, a nonlinear function of RBF networks, implementing an exponential function on a sum of squared values, which are obtained by subtracting a weighted sum and a reference value, seen as the "center" of the radial basis function, for example Gaussian (square of a distance between two vectors, for example). The normalized and/or saturated words can be saved within the storage memories 30 or 37 in order to be used or sent directly at the output of the neuron circuit.

Figure 4:
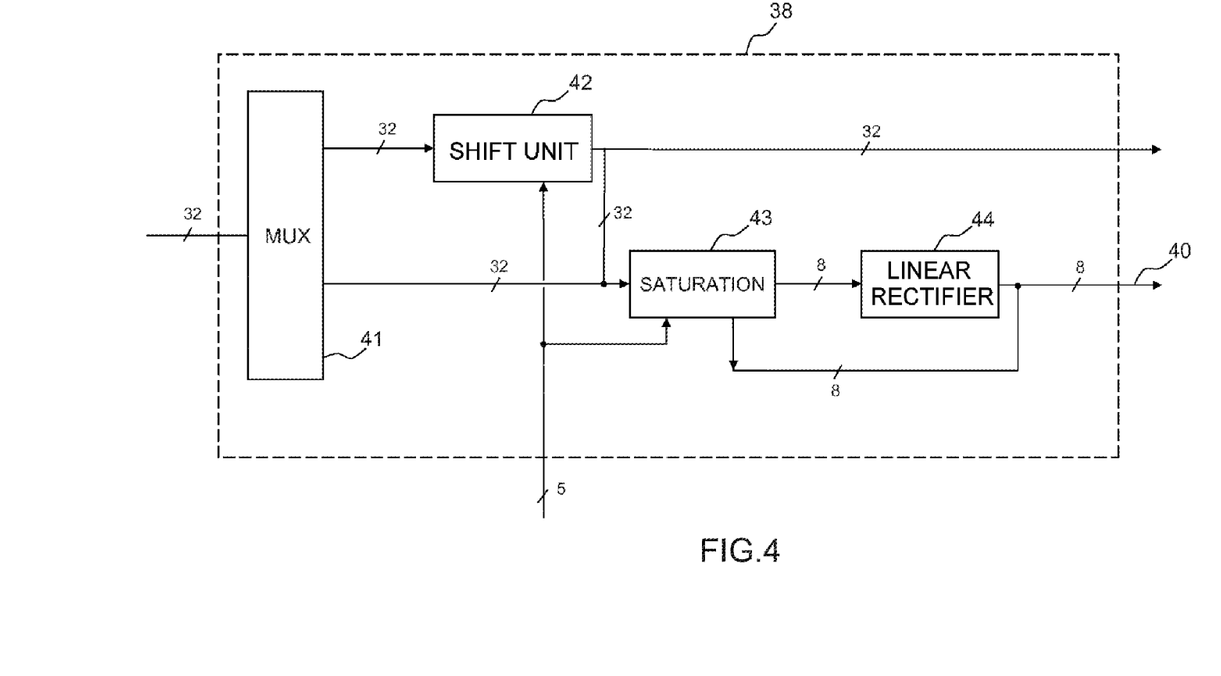
FIG. 4 depicts a block diagram of a generic unit effectively implementing various activation functions, which is used in the circuit according to the invention.

FIG. 4 shows a block diagram of the activation unit 38 implementing the functionalities described above. The activation unit has a shift unit 42 performing the shift operations described above. The output of the shift unit is connected to the input of a saturation unit 43. In a possible embodiment, which is particularly advantageous, the saturation unit 43 is combined with the shift unit 42.

The saturated datum present at the output of this unit 43 is transmitted at the output 40 of the activation unit. Using this first route, passing through the shift unit 42 and the saturation unit 43, the activation unit performs the complex nonlinear functions of hyperbolic tangent type. Another route performs the linear rectification. To this end, the activation unit has a linear rectifier 44 at the output of the saturation unit 43, these two elements 43, 44 forming this second route. At the input, a multiplexer 41 directs the incoming signal along one or the other route.

A control signal, for example encoded on 5 bits, indicates the value of the shift to be performed to the shift unit or to the saturation unit.

We now return to the neuron circuit of FIG. 3. This circuit according to the invention has an arithmetic and logic unit 39 (ALU), for example, in particular in charge of arithmetic operations, which is used to calculate distances in the event of implementation of networks of RBF type, for example. This unit 39 also allows the performance of operations of "max pooling" type for the associated layers. In the exemplary embodiment of FIG. 3, it performs operations on 8-bit data, signed or unsigned, and returns results also on 8 bits, these also being signed or unsigned.

A second storage unit 30, made up of 8-bit storage registers, is connected to the multiplier 31, to the ALU 39 and to the activation unit (for the parameter indicating the value of the shift to be performed, recovering only the 5 least significant bits on the incoming 8-bit word). The two banks of storage registers 30, 37 ensure management of the data from a central memory and/or saving of the results before they are sent thereto, but also ensure saving of the temporary results within the framework of multicycle operations. To this end, they are also connected to the accumulation unit 34 and to the generic activation unit 38. In particular, the 8-bit output is looped back to the bank of 8-bit storage registers, which is itself connected to the input of the activation unit 38. The output of the ALU 39 is also looped back to the bank of 8-bit storage registers. The activation unit 38 has a 32-bit output for storing intermediate calculation results in the 32-bit storage unit. This 32-bit storage unit also loops back to the accumulation unit 34 and the activation unit 38. It also stores the data extended to 32 bits from the extension unit 33.

A neuron circuit according to the invention affords numerous advantages. In particular, the use of low-precision calculation operators 31, 39 for multiplications and the output of the data path at the output 40 of the circuit, after saturation, allows the overall size of the data path and of the memory resources and necessary interconnections to be reduced, 8 bits being sufficient. This advantageously takes into consideration the fact that the neural networks are tolerant of reduced-precision calculations, in the recognition phase.

The use of larger-sized operators 34, 38, performing operations on 32 bits, for the accumulation 11 and the aspects linked to nonlinearity allow a programmer to control the evolution of the magnitude of the data (i.e. the maximum number of bits required in order to encode them). This relatively large size in relation to the size of the input operators allows the limits of the number of accumulations of weighted data to be pushed back. Moreover, these operators are equipped with mechanisms allowing any precision problem to be returned to the programmer, allowing him to manage any saturations in order to limit the influence of errors.

The use of a mechanism for the accumulation of the data allow the magnitude of the accumulated data to be obtained in real time, by calculating for each operating cycle the position of the significant bit of the word contained in the accumulator, greatly improves the operation of the circuit. In particular, this position can be transmitted to the programmer or can be used automatically to saturate or normalize a datum by taking into consideration its value in relation to a reference (normalization). The generic activation unit 38 allows various nonlinear functions to be approximated in one or more cycles, several characteristic activation functions of the neural networks being approximatable. It can also be used to perform data normalizations, that is to say to put all the data on one and the same reference, by virtue of the same operator performing shifts to the right and left. This allows the size of the group to be reduced in relation to two different dedicated operators while preserving the generic functionality.

A circuit according to the invention also has an intelligent link among the operators, in particular the accumulation unit 34 and the activation unit 38 approximating the nonlinear functions. Indeed, the position of the MSB of the word contained in the accumulation register 36 can thus automatically steer the activation unit 38 so as to output a word of 8 significant bits (most significant bits) and dependent on the accumulated data that are known in advance and/or to perform a normalization dependent on the same data.

The invention therefore advantageously allows applications based on deep neural networks to be executed with a high level of energy and surface area efficiency while guaranteeing application performance levels and a high level of control by the programmer over the precision of the data propagated by the processing chain. The invention advantageously makes use of possible reductions in the precision of the data manipulated in the recognition phase in order to approximate the nonlinear activation functions using simple operators. It also allows the programming of applications to be ensured without prior knowledge of the data set by virtue of considered use of the position of the MSB, offering adaptation to suit different data sets and different network topologies, as well as sizing of the operators according to the applications.

A neural architecture allowing the steps of the method for executing the neural network according to the invention to be performed has hardware and/or software elements. The software elements may be available as a computer program product on a computer-readable medium, a medium that may be electronic, magnetic, optical or electromagnetic. The hardware elements may be available in full or in part, in particular as dedicated integrated circuits (ASICs) and/or configurable integrated circuits (FPGAs) and/or as neuron circuits according to the invention or as a digital signal processor DSP and/or as a graphics processor GPU, and/or as a microcontroller and/or as a general processor, for example.

The invention claimed is:

1. A neuron circuit capable of producing a weighted sum of digitized input signals, which are encoded on a given number of bits, and of applying an activation function to said weighted sum in order to produce a digitized activation signal at an output, said circuit having at least:
    one multiplier multiplying each input signal ($x_1$ to $x_n$) by a weight value ($w_{1j}$ to $w_{nj}$);
    one accumulator accumulating results of said multiplier in order to produce said weighted sum, and;
    one activation unit performing said activation function;
    wherein said activation unit has at least one shift unit capable of approximating a nonlinear activation function, a result of said approximated activation function being obtained by one or more arithmetic shifts in the bits of said weighted sum,
    wherein the activation unit has a saturation unit capable of performing a saturation operation directly on said weighted sum or on a temporary result of the activation function before saturation, a saturated datum being delivered at the output of said activation unit,
    wherein the saturation unit is combined with the shift unit, the saturation being produced by a shift to the right on said weighted sum, a value of which is deduced from a desired saturation position, by preserving least significant bits of the sum, according to a desired final precision, and
    wherein the activation unit has a linear rectifier capable of performing a linear rectification on the datum present at an output of the saturation unit, said datum being the result of a saturation performed directly on said weighted sum present at the input of said activation unit, said linear rectification carrying out said activation function.

2. The neuron circuit as claimed in claim 1, wherein it has a register storing a position of a most significant bit of each new datum accumulated in said accumulator, the storage of said position being performed simultaneously with the storage in the accumulation register of the accumulation of said new datum or of the loading of said accumulation register.

3. The neuron circuit as claimed in claim 2, wherein said position of the most significant bit is transmitted to the shift unit, the shift applied being deduced from said position, or from a previously saved most significant bit position or from any parameter fixed by the user or contained in memory or previously calculated.

4. The neuron circuit as claimed in claim 2, wherein said position of the most significant bit is transmitted to the saturation unit, the shift applied for the saturation operation being deduced from said position or from a previously saved most significant bit position, or from any parameter fixed by the user or contained in memory or previously calculated.

5. The neuron circuit as claimed in claim 2, wherein said activation unit is capable of approximating a radial basis function, from a sequence of shift operations performed by said shift unit as well as by means of saturations performed by said saturation unit.

6. The neuron circuit as claimed in claim 5, wherein the value of each shift is deduced from said position of the most significant bit of the shifted datum or from a previously saved bit position, or from any parameter fixed by the user or contained in memory or previously calculated.

7. The neuron circuit as claimed in claim 1, wherein it has an arithmetic and logic unit carrying out operations on the input signals.

8. A neural architecture, comprising neuron circuits as claimed in claim 1.

9. A method for executing a neural network, said method producing, for each neuron, a weighted sum of digitized input signals, which are encoded on a given number of bits, and applying an activation function to said weighted sum in order to produce an activation signal at an output, wherein said method involves at least the following steps:
    multiplying each input signal ($x_1$ to $x_n$) by a weight value ($w_{1j}$ to $w_{nj}$);
    accumulating results of the multiplication in an accumulator in order to produce said weighted sum;
    performing said activation function by means of one or more arithmetic shifts in the bits of said weighted sum that are stored in said accumulator;
    performing a saturation operation directly on said weighted sum or on a temporary result of the activation function before saturation, a saturated datum being delivered at the output of said activation function;
    wherein the saturation operation is produced by a shift to the right on said weighted sum, a value of which is deduced from a desired saturation position, by preserving least significant bits of the sum, according to a desired final precision; and
    performing a linear rectification on the datum present at an output of the saturation operation, said datum being a result of a saturation performed directly on said weighted sum, said linear rectification carrying out said activation function.

10. The method as claimed in claim 9, wherein it has a step of storage of a position of a most significant bit of each new accumulated datum, said storage step being performed simultaneously with the storage of said new datum.

11. The method as claimed in claim 10, wherein the shift(s) applied in order to perform said activation function is or are deduced from said position or from a previously saved most significant bit position, or from any parameter fixed by the user or contained in memory or previously calculated.

12. The method as claimed in claim 10, wherein the shift(s) applied for the saturation operation is or are deduced from said position or from a previously saved most significant bit position, or from any parameter fixed by the user or contained in memory or previously calculated.

13. The method as claimed in claim 10, wherein it carries out the approximation of a radial basis activation function, from a sequence of shift operations as well as by means of saturations.

14. The method as claimed in claim 13, wherein the value of each shift is deduced from said position of the most significant bit of the shifted datum or from a previously saved bit position, or from any parameter fixed by the user or contained in memory or previously calculated.

15. A non-transitory, computer-readable medium, comprising instructions executable by a processor to perform the method as claimed in claim 9.

16. The neuron circuit of claim 1, wherein the result of said approximated activation function is obtained exclusively by one or more arithmetic shifts in the bits of said weighted sum.

17. The method of claim 9, wherein the result of said approximated activation function is obtained exclusively by one or more arithmetic shifts in the bits of said weighted sum.

* * * * *